(12) United States Patent
Wang

(10) Patent No.: US 11,249,630 B2
(45) Date of Patent: Feb. 15, 2022

(54) METHOD, APPARATUS, TERMINAL DEVICE, AND STORAGE MEDIUM FOR SWITCHING GLOBAL SPECIAL EFFECTS

(71) Applicant: BEIJING MICROLIVE VISION TECHNOLOGY CO., LTD, Beijing (CN)

(72) Inventor: Ya Wang, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/021,248

(22) Filed: Sep. 15, 2020

(65) Prior Publication Data

US 2020/0409542 A1    Dec. 31, 2020

Related U.S. Application Data

(63) Continuation of application No. PCT/CN2018/124745, filed on Dec. 28, 2018.

(30) Foreign Application Priority Data

Jun. 29, 2018 (CN) .......................... 201810697512.6

(51) Int. Cl.
 *G06F 3/0484* (2013.01)
 *G06F 3/0488* (2013.01)
 (Continued)

(52) U.S. Cl.
 CPC ...... *G06F 3/04845* (2013.01); *G06F 3/04883* (2013.01); *G06T 3/20* (2013.01);
 (Continued)

(58) Field of Classification Search
 CPC ............. G06F 3/04845; G06F 3/04883; G06F 2203/04803; G06F 2203/04804; G06T 3/20; G06T 13/80; G06T 2200/24
 See application file for complete search history.

(56) References Cited

U.S. PATENT DOCUMENTS 8,520,019 B1    8/2013    Freyhult et al.
8,520,028 B1    8/2013    Freyhult et al.
(Continued)

FOREIGN PATENT DOCUMENTS

CN    103838457 A    6/2014
CN    104205164 A    12/2014
(Continued)

OTHER PUBLICATIONS

International Search Report and Written Opinion dated Mar. 27, 2019 for PCT Patent Application PCT/CN2018/124745.
(Continued)

*Primary Examiner* — Seth A Silverman
(74) *Attorney, Agent, or Firm* — Thomas Horstemeyer, LLP

(57) ABSTRACT

Provided are a method, an apparatus, a terminal device and a storage medium for switching global special effects. The method includes steps described below. In response to detecting a sliding gesture on a target interface, two global special effects to be switched are determined according to a sliding direction of the sliding gesture. During a sliding process of the sliding gesture, the two global special effects are displayed on two sides of the target interface, and display regions of the two global special effects are changed according to a sliding displacement of the sliding gesture. In response to detecting a release operation of the sliding gesture, a global special effect having a larger display region from the two global special effects is determined as a
(Continued)

user-selected global special effect and is displayed on an entire region of the target interface.

15 Claims, 16 Drawing Sheets

(51) Int. Cl.
    *G06T 3/20*         (2006.01)
    *G06T 13/80*      (2011.01)

(52) U.S. Cl.
    CPC .... *G06T 13/80* (2013.01); *G06F 2203/04803* (2013.01); *G06F 2203/04804* (2013.01); *G06T 2200/24* (2013.01)

(56) References Cited

U.S. PATENT DOCUMENTS

| | | | |
|---|---|---|---|
| 8,525,855 | B1 | 9/2013 | Freyhult et al. |
| 8,717,381 | B2 | 5/2014 | Hayward et al. |
| 9,531,947 | B2 | 12/2016 | Hayward et al. |
| 10,051,175 | B2 | 8/2018 | Kim et al. |
| 10,191,636 | B2 | 1/2019 | Hayward et al. |
| 10,642,483 | B2 | 5/2020 | Wang et al. |
| 10,788,967 | B2 | 9/2020 | Hayward et al. |
| 2009/0073314 | A1 | 3/2009 | Uemukai et al. |
| 2011/0175930 | A1* | 7/2011 | Hwang ............... G06F 3/0488 345/629 |
| 2012/0176401 | A1 | 7/2012 | Hayward et al. |
| 2013/0022943 | A1 | 1/2013 | Collins et al. |
| 2013/0229436 | A1* | 9/2013 | Freyhult ............... G06T 11/60 345/650 |
| 2013/0229438 | A1 | 9/2013 | Freyhult et al. |
| 2013/0229439 | A1 | 9/2013 | Freyhult et al. |
| 2014/0089833 | A1* | 3/2014 | Hwang ............... G06F 3/0488 715/769 |
| 2014/0240539 | A1 | 8/2014 | Hayward et al. |
| 2014/0313389 | A1* | 10/2014 | Kim .................. H04N 5/23293 348/333.12 |
| 2015/0172534 | A1 | 6/2015 | Miyakawa et al. |
| 2015/0281591 | A1 | 10/2015 | Yahyavi |
| 2016/0216834 | A1 | 7/2016 | Ludwig |
| 2017/0083218 | A1 | 3/2017 | Hayward et al. |
| 2018/0356972 | A1* | 12/2018 | Wang ..................... G06F 3/044 |
| 2019/0310768 | A1 | 10/2019 | Hayward et al. |
| 2020/0379634 | A1 | 12/2020 | Hayward et al. |
| 2021/0011610 | A1 | 1/2021 | Hwang et al. |

FOREIGN PATENT DOCUMENTS

| | | |
|---|---|---|
| CN | 104322050 A | 1/2015 |
| CN | 105357451 A | 2/2016 |
| CN | 105373291 A | 3/2016 |
| CN | 106201242 A | 12/2016 |
| CN | 106331502 A | 1/2017 |
| CN | 106406505 A | 2/2017 |
| CN | 107077295 A | 8/2017 |
| CN | 107896306 A | 4/2018 |
| CN | 108984094 A | 12/2018 |
| JP | 2011229117 A | 11/2011 |
| JP | 2011244421 A | 12/2011 |
| JP | 2014082586 A | 5/2014 |
| JP | 2015519625 A | 7/2015 |
| JP | 2015173514 A | 10/2015 |
| KR | 20140127359 A | 11/2014 |
| KR | 20140136794 A | 12/2014 |
| KR | 20180000255 A | 1/2018 |
| RU | 59431 U1 | 12/2006 |
| WO | 2013175784 A1 | 11/2013 |
| WO | 2017088131 A1 | 6/2017 |

OTHER PUBLICATIONS

1st Search Report for Chinese Patent Application No. 201810697512.6.
1st Office Action dated May 23, 2019 for Chinese Patent Application No. 201810697512.6.
Supplementary Search Report dated Jul. 1, 2019 for Chinese Patent Application No. 201810697512.6.
1st Office Action dated Mar. 2, 2021 for Japanese Patent Application No. 2020558509.
Office Action dated May 10, 2021 for Korean Patent Application No. 20207032742.
Office Action dated May 11, 2021 for Japanese Patent Application No. 2020558509.
Office Action dated May 25, 2021 in co-pending Australian Patent Application No. 2018430595 filed Dec. 28, 2018.
Russian First Office Action for Russian Patent Application No. 2020135601/28 (065585) mailed Jul. 8, 2021 (partially translated).
Australian Notice of Acceptance for Australian Patent Application No. 2018430595 dated Nov. 2, 2021.
Korean Second Office Action for Korean Patent Application No. 20207032742 dated Sep. 28, 2021.
Canadian First Office Action for Canadian Patent Application No. 3,097,779 dated Oct. 21, 2021.
European Search Report for European Patent Application No. 18924165.6 dated Nov. 25, 2021.

* cited by examiner

METHOD, APPARATUS, TERMINAL DEVICE, AND STORAGE MEDIUM FOR SWITCHING GLOBAL SPECIAL EFFECTS

CROSS REFERENCE TO RELATED APPLICATIONS

This is continuation of International Patent Application No. PCT/CN2018/124745, filed on Dec. 28, 2018, which is based on and claims priority to Chinese Patent Application No. 201810697512.6 filed with CNIPA on Jun. 29, 2018, disclosures of which are incorporated herein by reference in their entireties.

TECHNICAL FIELD

Embodiments of the present disclosure relate to the field of Internet technologies and, for example, relate to a method, an apparatus, a terminal device, and a storage medium for switching global special effects.

BACKGROUND

Filters, as global special effects, can implement a variety of artistic effects of images. Adding a filter to an original picture of images can realize the artistic processing of the picture and make it present an artistic effect.

An image or video capture software generally provides a variety of filters for a user to choose from. In the related art, when a filter is to be used or switched, the user should first click a filter control to call up a filter region, and then click a corresponding filter in the filter region. Thus, the filter is switched. During the switching, a current display effect is directly switched to a filter effect corresponding to the filter selected by the user. Therefore, it is not convenient for the user to compare different filter effects, the switching efficiency is relatively low, and the user experience is affected.

SUMMARY

In view of the above, embodiments of the present disclosure provide a method and apparatus for switching global special effects, a terminal device and a storage medium, so as to improve the switching efficiency of the global special effects and improve the user experience.

The embodiments of the present disclosure provide a method for switching global special effects. The method includes steps described below.

In response to detecting a sliding gesture on a target interface, two global special effects to be switched according to a sliding direction of the sliding gesture is determined. During a sliding process of the sliding gesture, the two global special effects are displayed on two sides of the target interface simultaneously, and display regions of the two global special effects are changed according to a sliding displacement of the sliding gesture.

In response to detecting a release operation of the sliding gesture, a global special effect having a larger display region is determined from the two global special effects as a user-selected global special effect, and the user-selected global special effect is displayed on an entire region of the target interface.

The embodiments of the present disclosure further provide an apparatus for switching global special effects. The apparatus includes a to-be-switched special effect determination module, a simultaneous display module and a global special effect switching module.

The to-be-switched special effect determination module is configured to determine, in response to detecting a sliding gesture in a target interface, two global special effects to be switched according to a sliding direction of the sliding gesture.

The simultaneous display module is configured to display, during a sliding process of the sliding gesture, the two global special effects on two sides of the target interface simultaneously, and change display regions of the two global special effects according to a sliding displacement of the sliding gesture.

The global special effect switching module is configured to determine, in response to detecting a release operation of the sliding gesture, a global special effect having a larger display region from the two global special effects as a user-selected global special effect, and display the user-selected global special effect on an entire region of the target interface.

The embodiments of the present disclosure further provide a terminal device. The terminal device includes: a memory configured to store instructions; and one or more processors coupled to the memory, the one or more processors configured, in conjunction with execution of the instructions stored in the memory, to: determine, in response to detecting a sliding gesture on a target interface, two global special effects to be switched according to a sliding direction of the sliding gesture; display, during a sliding process of the sliding gesture, the two global special effects on two sides of the target interface simultaneously, and change display regions of the two global special effects according to a sliding displacement of the sliding gesture; and determine, in response to detecting a release operation of the sliding gesture, a global special effect having a larger display region from the two global special effects as a user-selected global special effect, and display the user-selected global special effect on an entire region of the target interface.

The embodiments of the present disclosure further provide a non-transitory computer-readable storage medium which is configured to store a computer program. When executed by a processor, the computer program performs steps of: determining, in response to detecting a sliding gesture on a target interface, two global special effects to be switched according to a sliding direction of the sliding gesture; displaying, during a sliding process of the sliding gesture, the two global special effects on two sides of the target interface simultaneously, and changing display regions of the two global special effects according to a sliding displacement of the sliding gesture; and determining, in response to detecting a release operation of the sliding gesture, a global special effect having a larger display region from the two global special effects as a user-selected global special effect, and displaying the user-selected global special effect on an entire region of the target interface.

DETAILED DESCRIPTION

Figure 1:
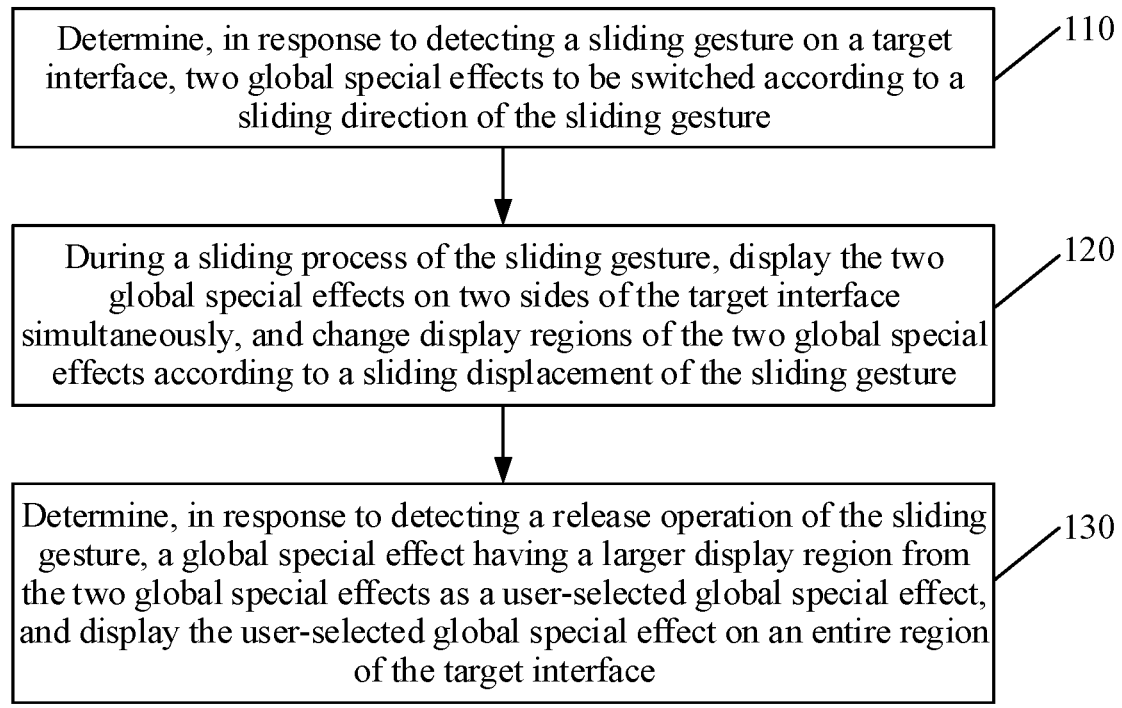
FIG. 1 is a flowchart of a method for switching global special effects according to embodiment one of the present disclosure.

The present disclosure will be further described in detail with reference to drawings embodiments. It is to be understood that the embodiments described herein are intended to illustrate and not to limit the present disclosure. It is to be noted that for description, only part, not all of content related to the present disclosure are illustrated in the drawings.

Embodiment One

FIG. 1 is a flowchart of a method for switching global special effects according to embodiment one of the present disclosure. The present embodiment may be applicable to a case of switching global special effects of a video or a photo. The method may be performed by an apparatus for switching global special effects. The apparatus may be implemented by at least one of software or hardware and may be generally integrated into a terminal device such as a mobile phone or a tablet computer. The method includes steps 110, 120 and 130.

In step 110, in response to detecting a sliding gesture on a target interface, two global special effects to be switched are determined according to a sliding direction of the sliding gesture.

In one embodiment, the target interface may include a video capture interface, a video editing interface, a photo capture interface or a photo editing interface. The sliding direction includes an up direction, a down direction, a left direction or a right direction. The global special effects are special effects those applied to all pixels of a photo or a video. Optionally, the global special effects include at least one of a filter, transparency, or other special effects. For example, the filter includes Japanese style, Sense of aging, Pure, Impressive or Innocent, etc. The transparency is used for adjusting transparency of a photo or a video, such as 50%, 60%, 70% or 80%, etc.

In a case where a video or a photo is captured or edited, the global special effects may be switched according to the sliding gesture. In response to detecting a sliding gesture, the sliding direction of the sliding gesture is determined, and if the sliding direction of the sliding gesture is the same as a preset sliding direction, the two global special effects to be switched may be determined according to the sliding direction of the sliding gesture. A sliding gesture may be preset to call up a switching of the global special effects. In a case where no global special effect is applied to a current target interface and the detected sliding gesture is the preset sliding gesture, the switching of the global special effects can be called up, that is when a sliding direction of the detected sliding gesture is the same as a sliding direction of the preset sliding gesture, the switching of the global special effects can be called up, and then the two global special effects to be switched can be determined. For example, a case where no global special effect is used refers to Normal which is also one of the global special effects, and when the detected sliding gesture is the preset sliding gesture, it can be determined that the two global special effects to be switched are Normal and a first global special effect of the global special effects. In a case where a global special effect is used on the current target interface, two adjacent global special effects can be switched by a sliding gesture in a same direction or in an opposite direction to the preset sliding gesture, and the two adjacent global special effects include a global special effect used before the sliding gesture is detected and a global special effect determined according to the sliding gesture, in which the determined global special effect is adjacent to the used global special effect. The preset sliding gesture may include a left sliding gesture, a right sliding gesture, an up sliding gesture, or a down sliding gesture, and for example, the preset sliding gesture may be set as the left sliding gesture.

In step 120, during a sliding process of the sliding gesture, the two global special effects are displayed on two sides of the target interface simultaneously, and display regions of the two global special effects are changed according to a sliding displacement of the sliding gesture.

When a terminal device is in a vertical screen status or a horizontal screen status, if the sliding gesture is the left sliding gesture or the right sliding gesture, two global special effects to be switched may be displayed on the left side and the right side of the target interface simultaneously. And when the terminal device is in a vertical screen status or a horizontal screen status, if the sliding gesture is the up sliding gesture or the down sliding gesture, the two global special effects to be switched may be displayed on the upper side and the lower side of the target interface simultaneously. A first global special effect of the two global special effects is the global special effect displayed before the sliding gesture is detected, and a second global special effect of the two global special effects is the global special effect stored adjacent to the first global special effect and is determined according to the sliding direction of the sliding gesture. During a sliding process of the sliding gesture in the sliding direction, a display region of the first global special effect becomes smaller, and a display region of the second global special effect becomes larger. If the sliding direction of the sliding gesture is changed, the display region of the first global special effect becomes larger and the display region of the second global special effect becomes smaller, i.e. a size of the display region of the first global special effect is inversely proportional to the sliding displacement of the sliding gesture, and a size of the display region of the second global special effect is directly proportional to the sliding displacement of the sliding gesture. In a case where the sliding gesture is the left sliding gesture or the right sliding gesture, the sliding displacement is a transversal displacement component; and in a case where the sliding gesture is the up sliding gesture or the down sliding gesture, the sliding displacement is a longitudinal displacement component, that is, a moving displacement of the second global special effect is linearly related to the sliding displacement of the sliding gesture. For example, in response to the sliding gesture moving one pixel, the second global special effect moves two pixels in a corresponding direction of the sliding gesture, and correspondingly, the first global special effect moves two pixels in the corresponding direction of the sliding gesture, so that the display region of the first global special effect is reduced by two pixels in the corresponding direction. By displaying two global special effects on two sides of the target interface simultaneously, it is convenient for the user to compare the two global special effects and select a preferable global special effect.

Figure 2A:
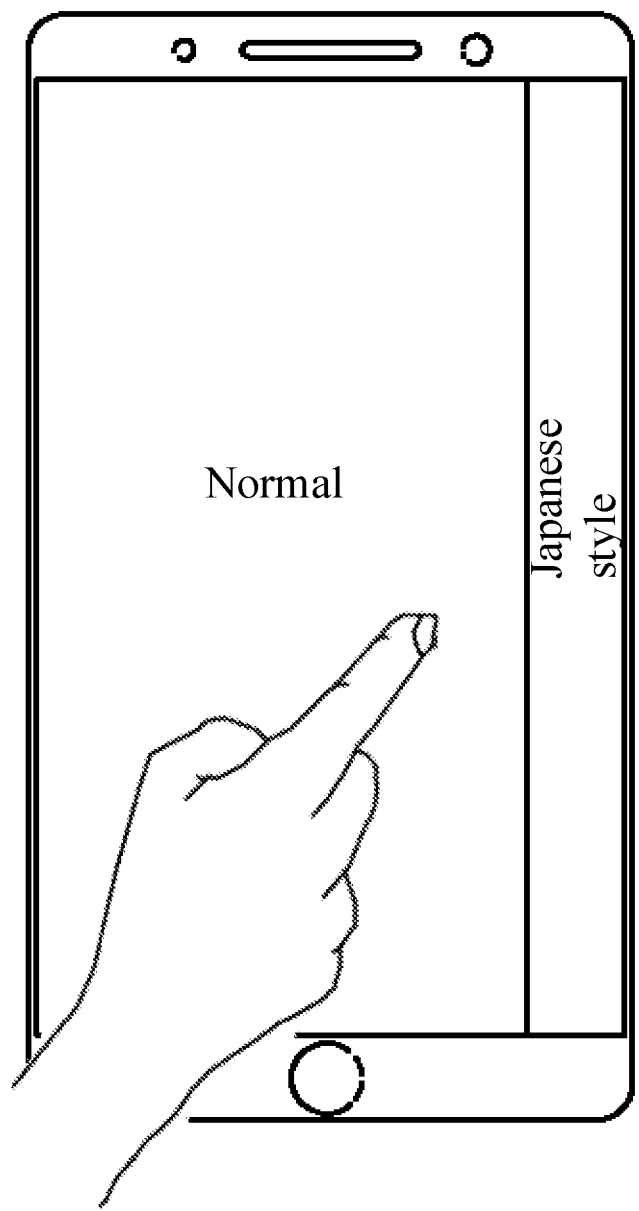
FIGS. 2a to 2c are schematic diagrams of displaying two global special effects on a left side and a right side of a target interface simultaneously in a case where a sliding direction in a vertical screen status is a left direction or a right direction in embodiments of the present disclosure.
Figure 2B:
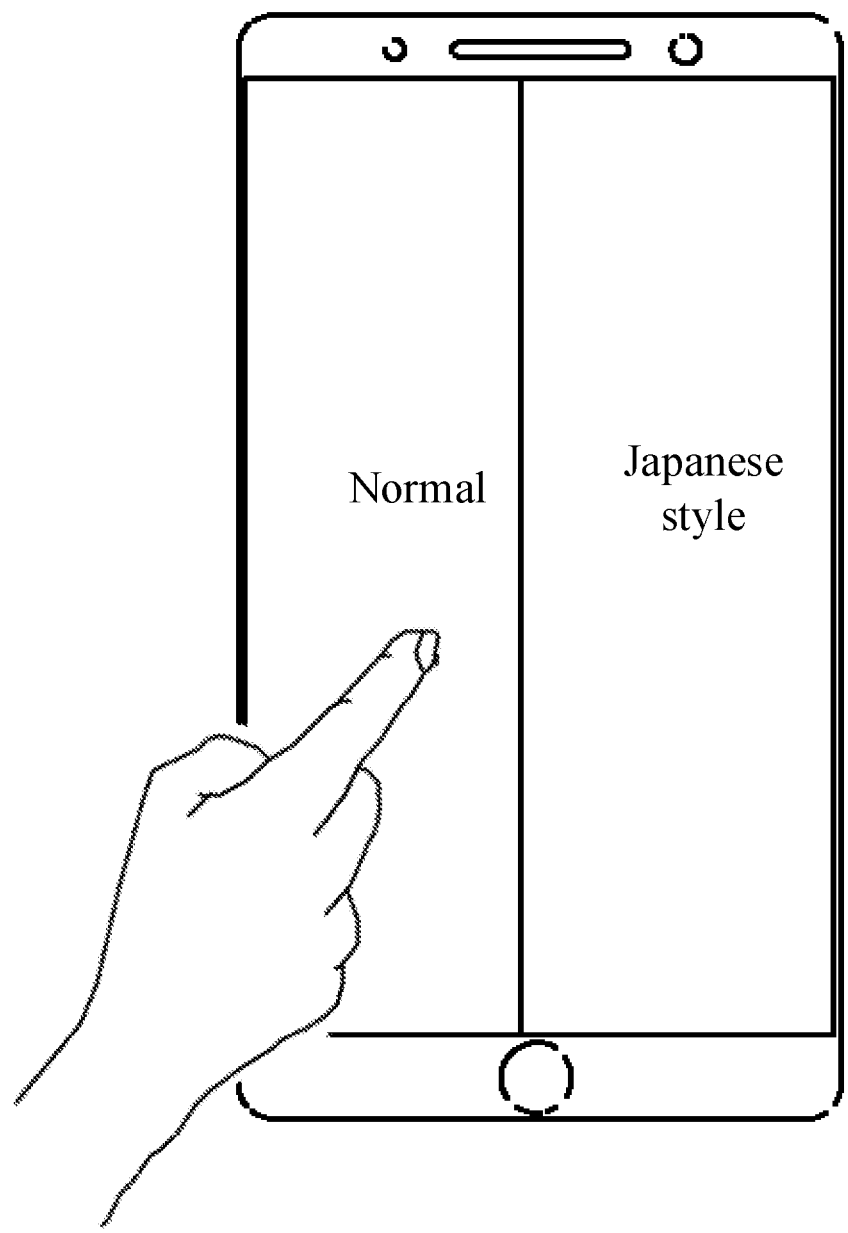
Figure 2C:
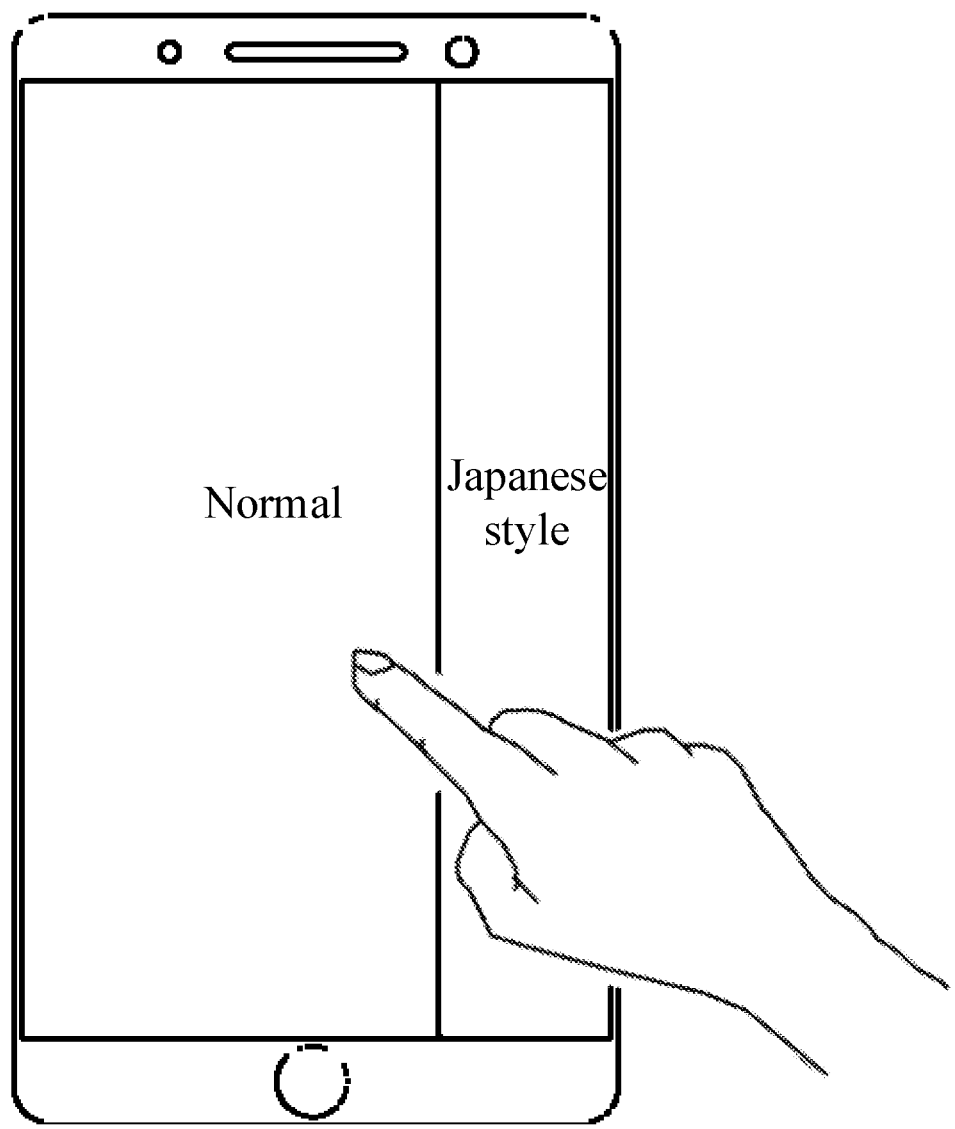

Taking the global special effect is the filter for example. FIGS. 2a to 2c are schematic diagrams of displaying two global special effects on a left side and a right side of a target interface simultaneously in a case where a sliding direction is a left direction or a right direction when the terminal device is in a vertical screen status in embodiments of the present disclosure. As shown in FIG. 2a, in the vertical screen status, when the sliding direction of the sliding gesture is detected as the left direction, firstly, a used global special effect before the sliding gesture is detected is determined to be the first global special effect of the two global special effects to be switched, and a global special effect adjacent to the first global special effect is taken as the second global special effect of the two global special effect to be switched. An example that the first global special effect before the sliding gesture is detected is Normal, and the second global special effect after the sliding gesture is detected is Japanese style, along with the sliding gesture sliding from right to left, the display regions of the two global special effects are changed accordingly are illustrated in FIGS. 2a, 2b, and 2c. As shown in FIG. 2b, on the basis of FIG. 2a, the display region of the first global special effect is becoming smaller and smaller, and the display region of the second global special effect is becoming larger and larger. If the sliding direction of the sliding gesture is changed during the sliding process of the sliding gesture, the display regions of the two global special effects can be changed accordingly. As shown in FIG. 2c, that is, on the basis of FIG. 2b, the display region of the first global special effect gets larger and the display region of the second global special effect gets smaller.

Figure 2D:
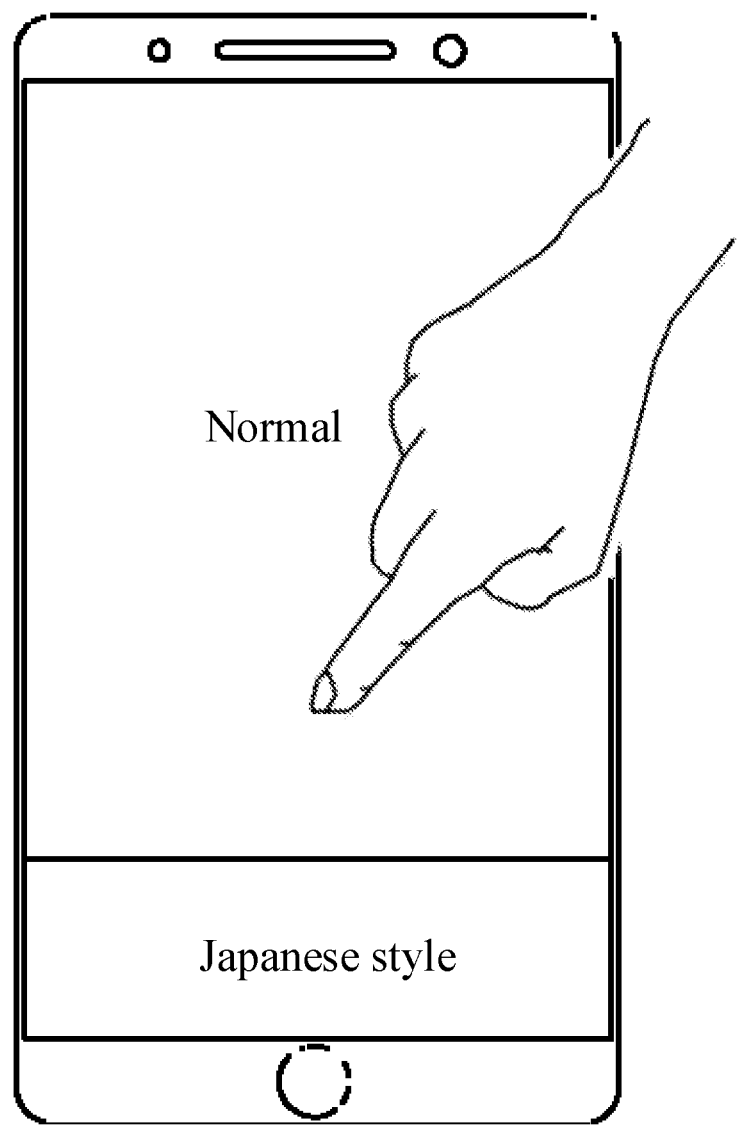
FIGS. 2d to 2f are schematic diagrams of displaying two global special effects on an upper side and a lower side of a target interface simultaneously in a case where a sliding direction in a vertical screen status is an up direction or a down direction in embodiments of the present disclosure.
Figure 2E:
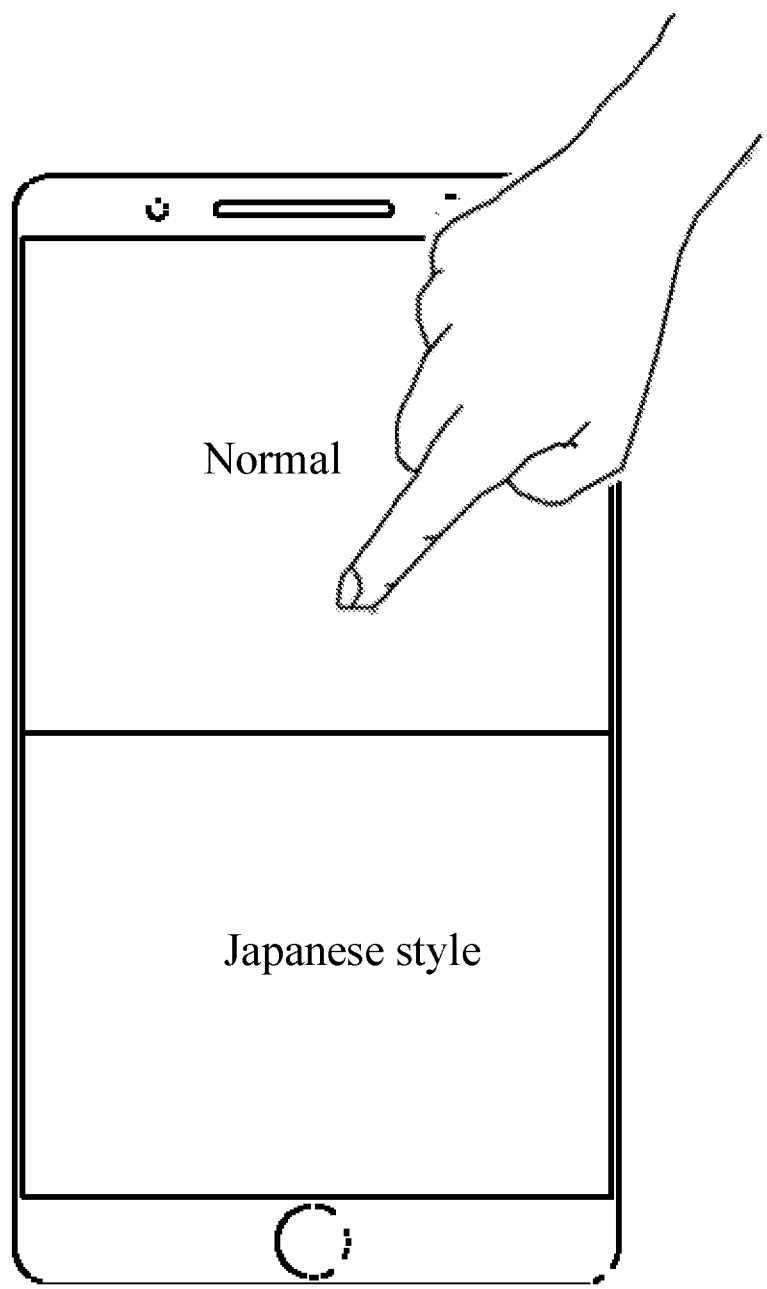
Figure 2F:
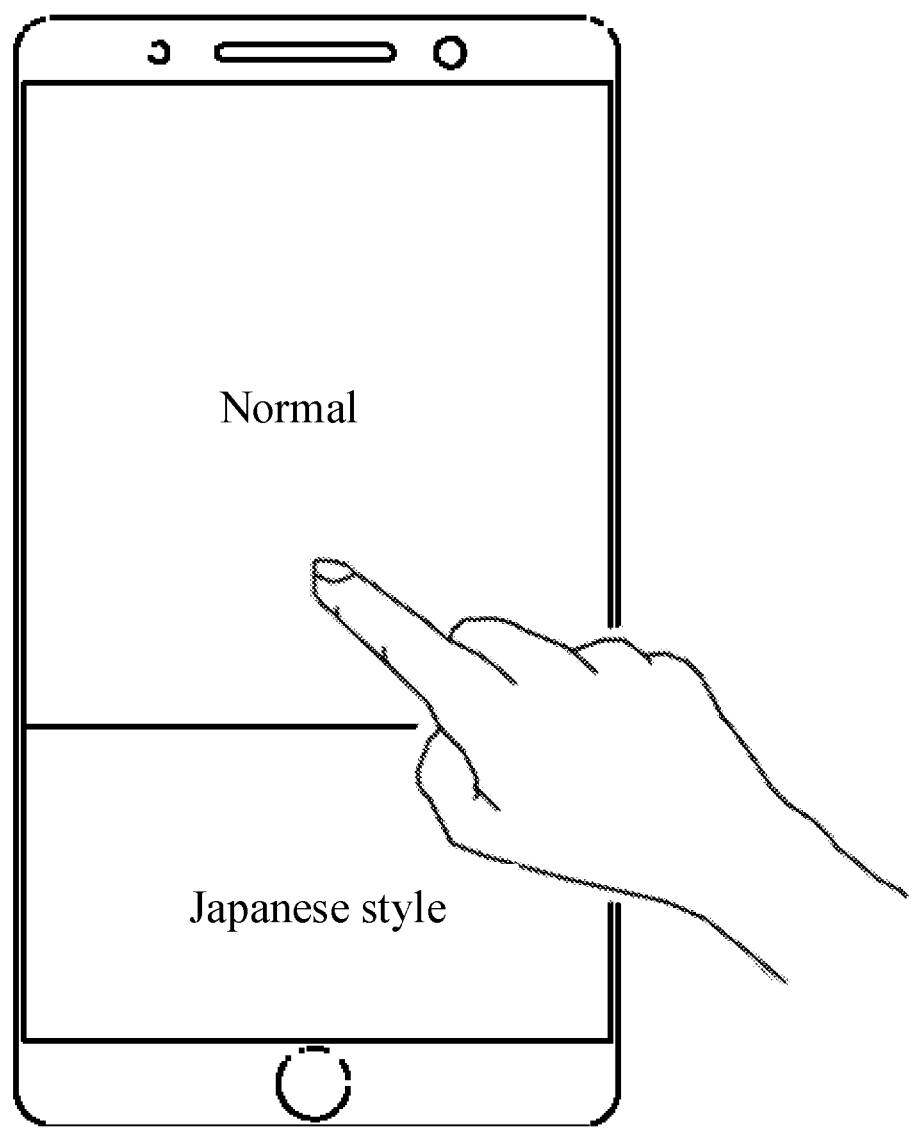

Taking the global special effect is the filter for example. FIGS. 2d to 2f are schematic diagrams of displaying two global special effects on an upper side and a lower side of a target interface simultaneously in a case where a sliding direction in a vertical screen status is an up direction or a down direction in embodiments of the present disclosure. As shown in FIG. 2d, in a case where the sliding direction of the sliding gesture is detected as the up direction, firstly, a used global special effect before the sliding gesture is detected is determined to be the first global special effect of the two global special effects to be switched, and a global special effect adjacent to the first global special effect is taken as the second global special effect of the two global special effects to be switched. An example that the first global special effect before the sliding gesture is detected is Normal, and the second global special effect after the sliding gesture is detected is Japanese style, along with the sliding gesture sliding from down to up, the display regions of the two global special effects are changed accordingly are illustrated in FIGS. 2d, 2e, and 2f. As shown in FIG. 2e, on the basis of FIG. 2d, the display region of the first global special effect is becoming smaller and smaller, and the display region of the second global special effect is becoming larger and larger. If the sliding direction of the sliding gesture is changed during the sliding process of the sliding gesture, the display regions of the two global special effects can be changed accordingly. As shown in FIG. 2f, that is, on the basis of FIG. 2e, the display region of the first global special effect gets larger and the display region of the second global special effect gets smaller.

Figure 2G:
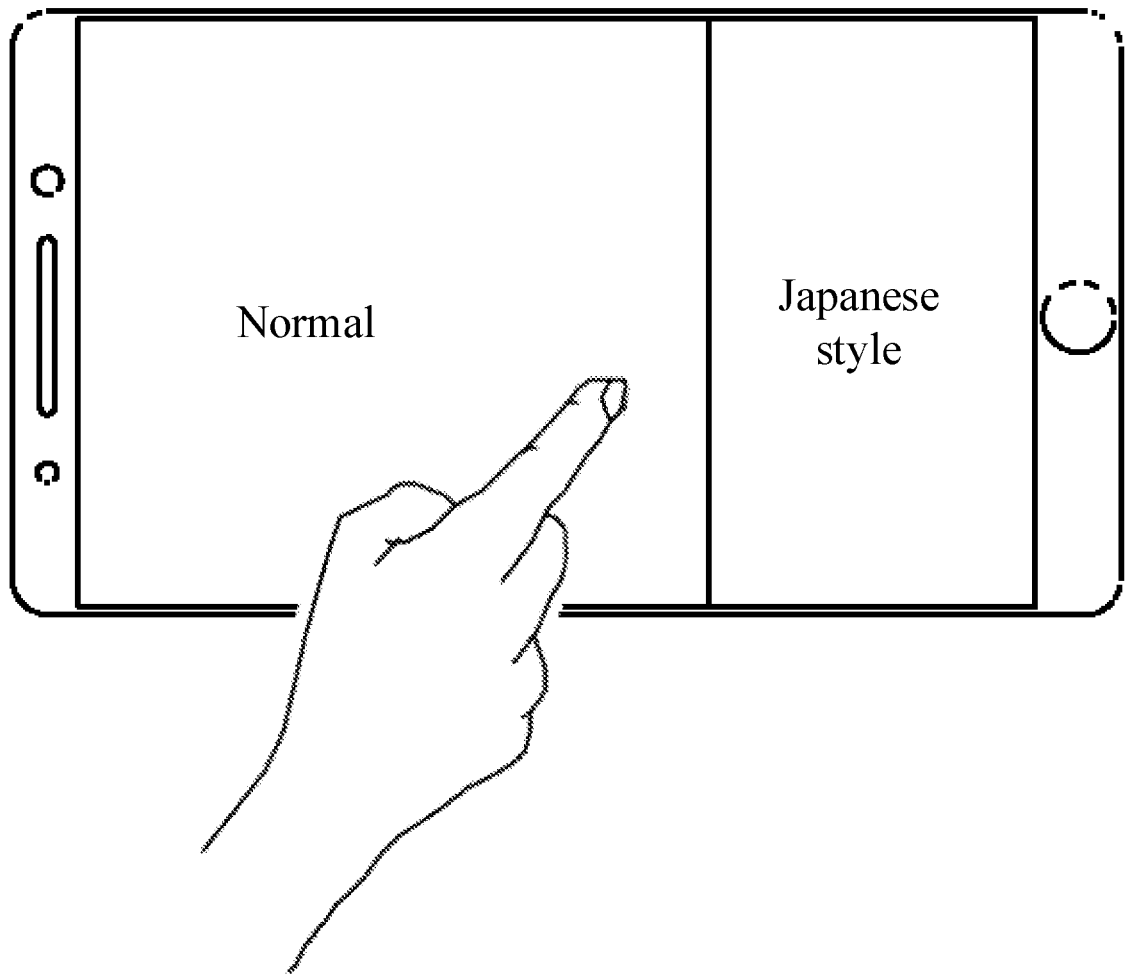
FIGS. 2g to 2i are schematic diagrams of displaying two global special effects on a left side and a right side of a target interface simultaneously in a case where a sliding direction in a horizontal screen status is a left direction or a right direction in embodiments of the present disclosure.
Figure 2H:
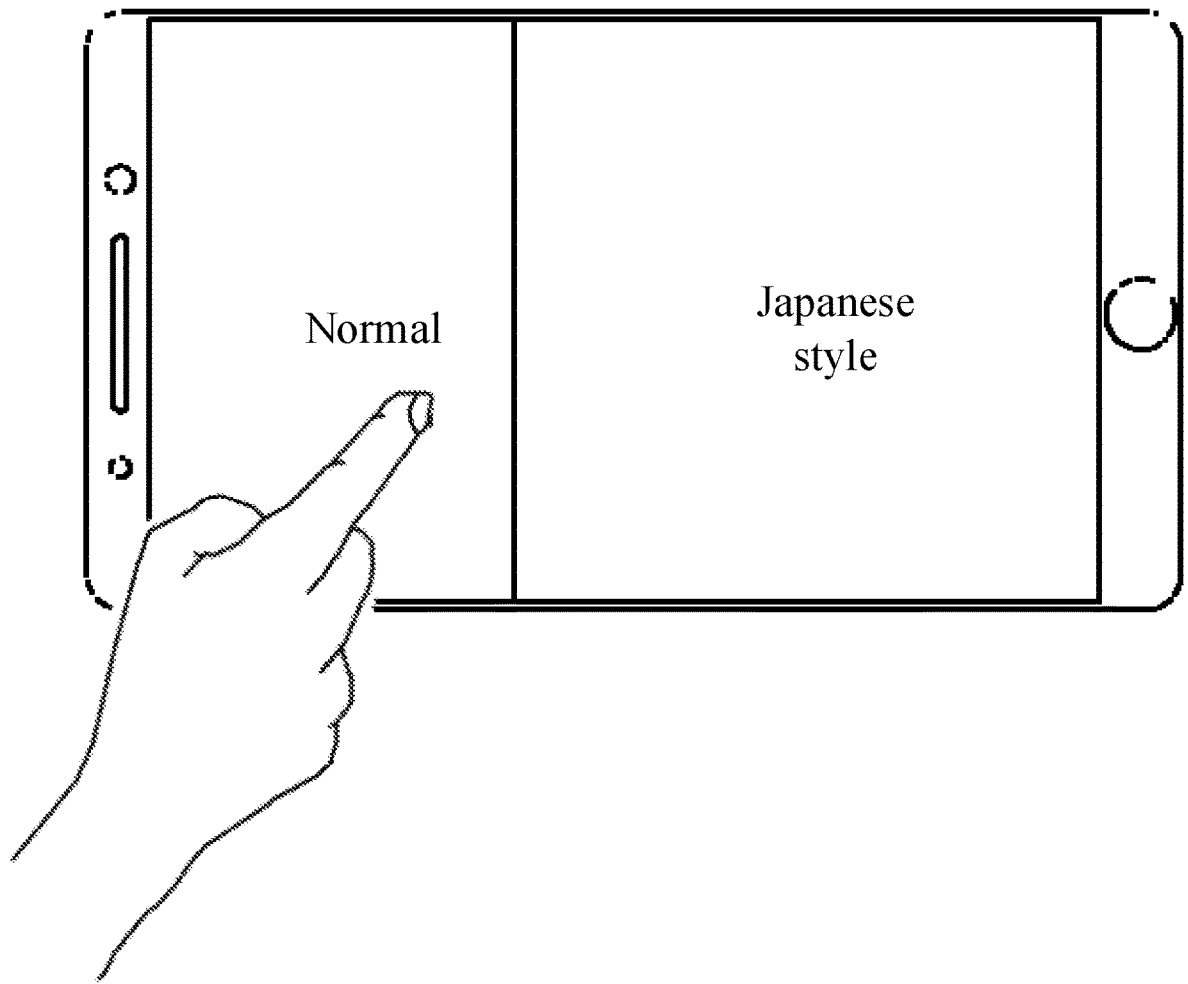
Figure 2I:
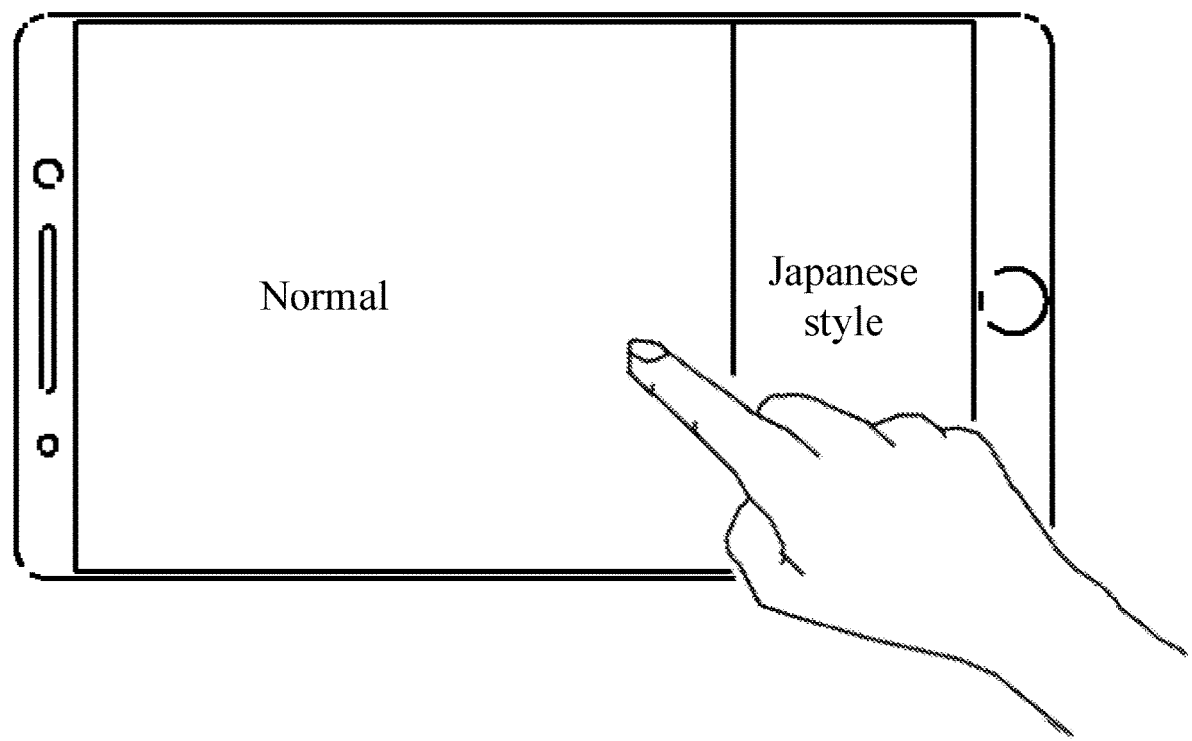

Taking the global special effect is the filter as an example. FIGS. 2g to 2i are schematic diagrams of displaying two global special effects on a left side and a right side of a target interface simultaneously in a case where a sliding direction in a horizontal screen status is a left direction or a right direction in embodiments of the present disclosure. As shown in FIG. 2g, in the horizontal screen status, when the sliding direction of the sliding gesture is detected as the left direction, firstly, a used global special effect before the sliding gesture is detected is determined to be the first global special effect of the two global special effects to be switched, and a global special effect adjacent to the first global special effect is taken as the second global special effect of the two global special effects to be switched. An example that the first global special effect before the sliding gesture is detected is Normal, and the second global special effect after the sliding gesture is detected is Japanese style, along with the sliding gesture sliding from right to left, the display regions of the two global special effects are changed accordingly are illustrated in FIGS. 2g, 2h, and 2i. As shown in FIG. 2h, on the basis of FIG. 2g, the display region of the first global special effect is becoming smaller and smaller, and the display region of the second global special effect is becoming larger and larger. If the sliding direction of the sliding gesture is changed during the sliding process of the sliding gesture, the display regions of the two global special effects can be correspondingly changed. As shown in FIG. 2i, that is, on the basis of FIG. 2h, the display region of the first global special effect gets larger and the display region of the second global special effect gets smaller.

Figure 2J:
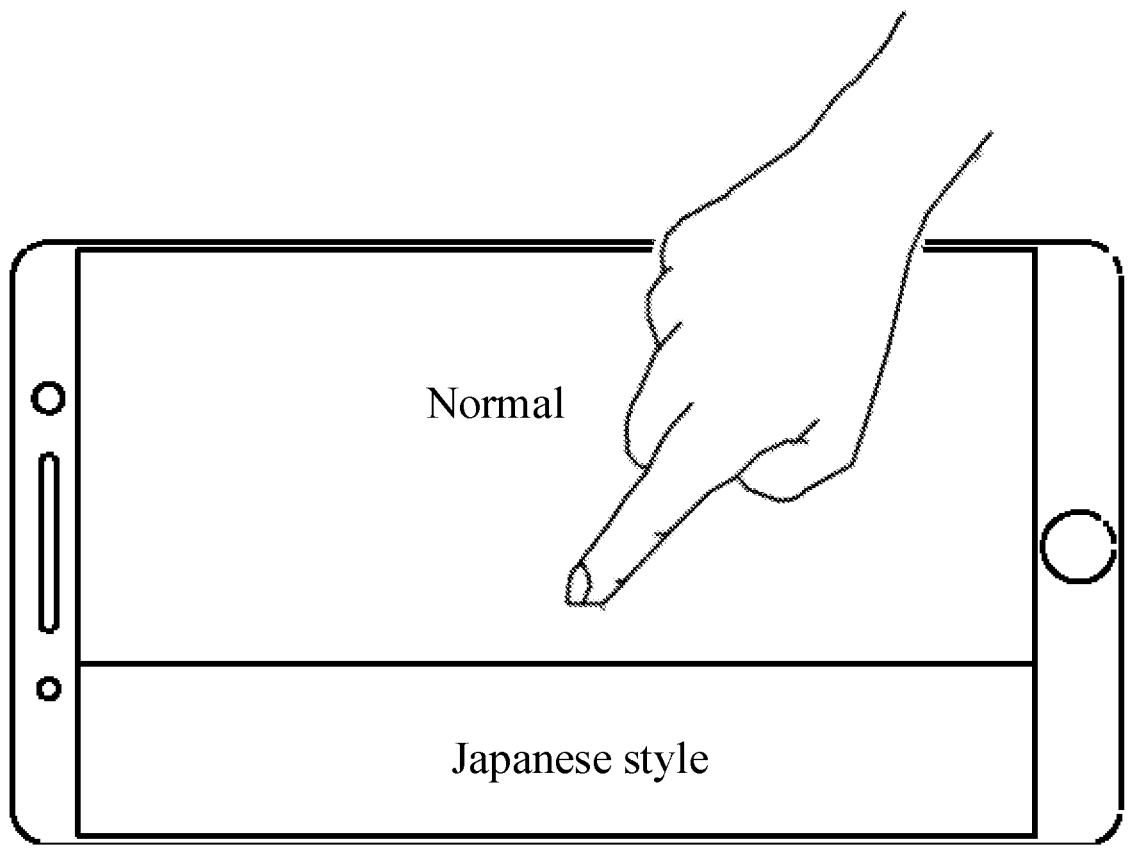
FIGS. 2j to 2l are schematic diagrams of displaying two global effects on an upper side and a lower side of a target interface simultaneously in a case where a sliding direction in a horizontal screen status is an up direction or a down direction in embodiments of the present disclosure.
Figure 2K:
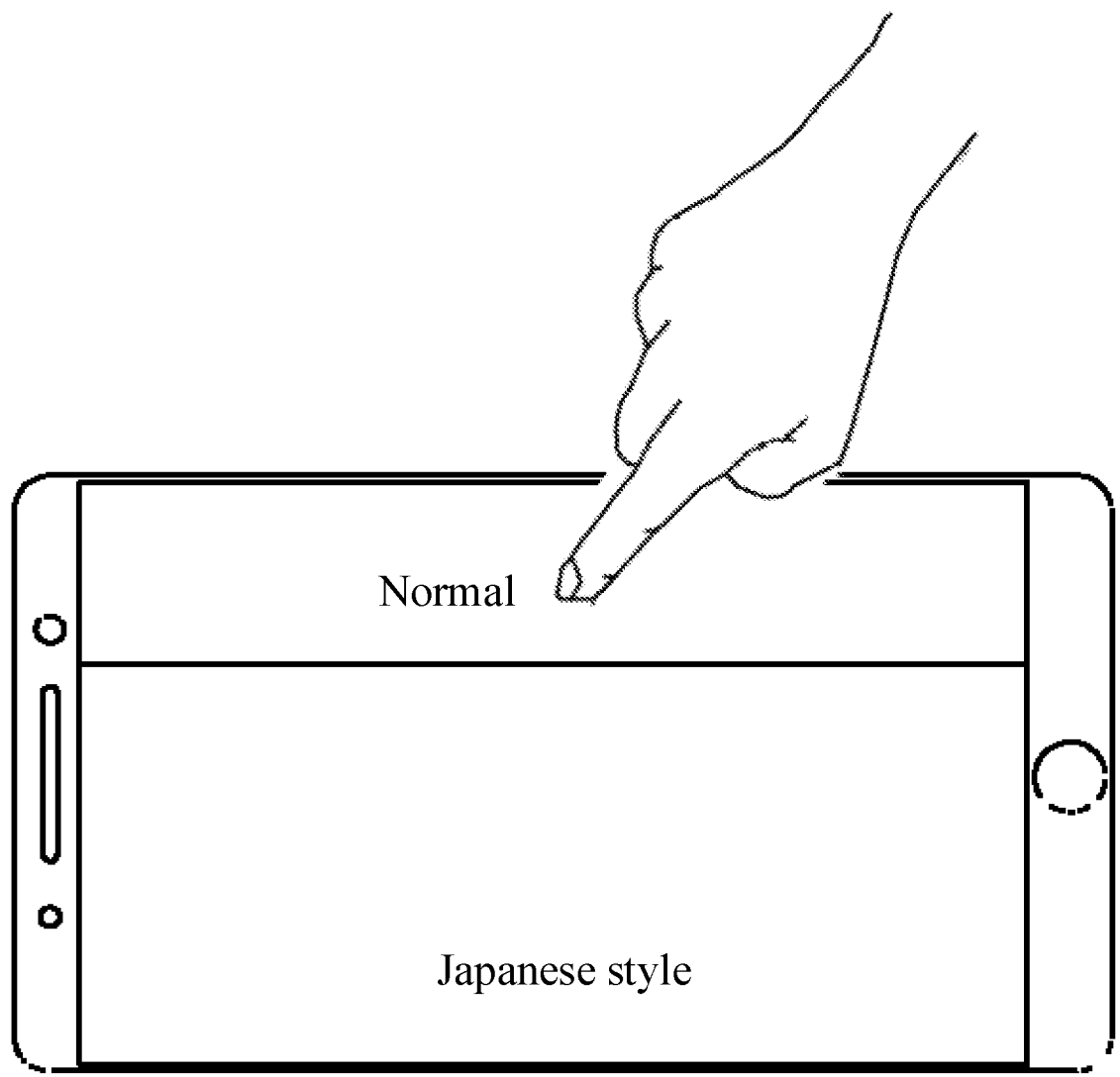
Figure 2L:
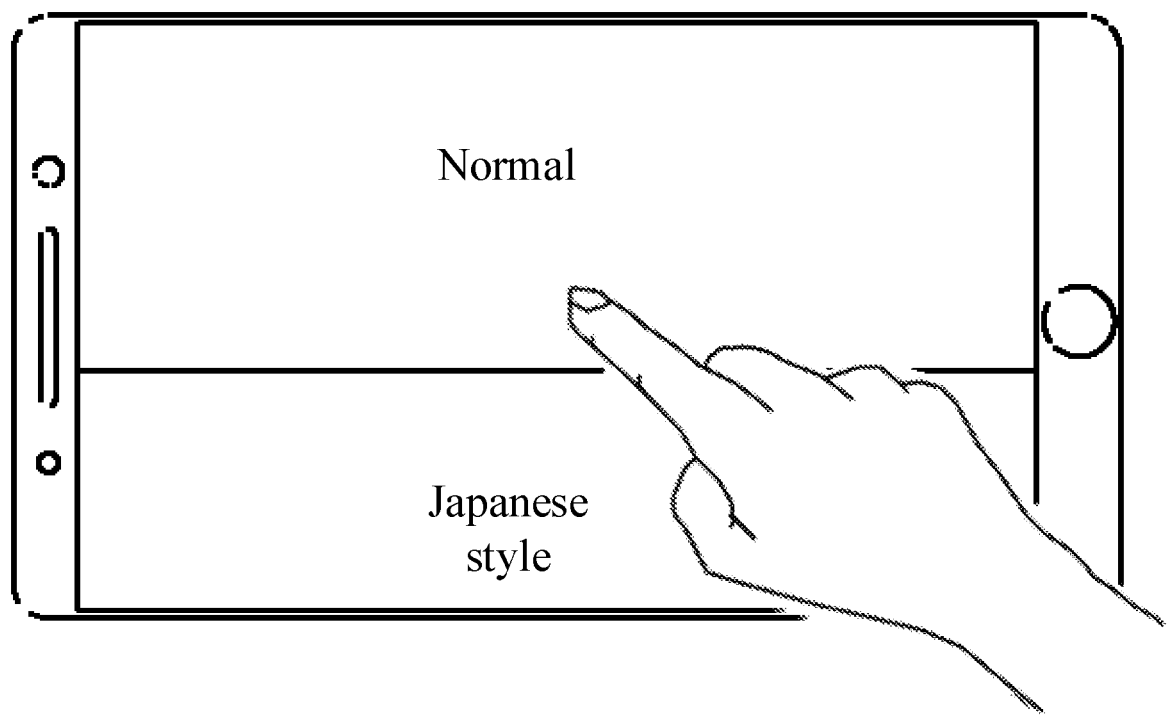

Taking the global special effect is the filter as an example. FIGS. 2j to 2l are schematic diagrams of displaying two global special effects on an upper side and a lower side of a target interface simultaneously in a case where a sliding direction in a horizontal screen status is an up direction or a down direction in embodiments of the present disclosure. As shown in FIG. 2j, when the sliding direction of the sliding gesture is detected as the up direction, firstly, a used global special effect before the sliding gesture is detected is determined to be the first global special effect of the two global special effects to be switched, and a global special effect adjacent to the first global special effect is taken as the second global special effect of the two global special effects to be switched. An example that the first global special effect before the sliding gesture is detected is Normal, and the second global special effect after the sliding gesture is detected is Japanese style, along with the sliding gesture sliding from down to up, the display regions of the two global special effects are changed accordingly are illustrated in FIGS. 2j, 2k, and 2l. As shown in FIG. 2k, on the basis of FIG. 2j, the display region of the first global special effect is becoming smaller and smaller, and the display region of the second global special effect is becoming larger and larger. If the sliding direction of the sliding gesture is changed during the sliding process of the sliding gesture, the display regions of the two global special effects can be changed accordingly. As shown in FIG. 2l, that is, on the basis of FIG. 2k, the display region of the first global special effect gets larger and the display region of the second global special effect gets smaller.

In step 130, in response to detecting a release operation of the sliding gesture, a global special effect having a larger display region is determined from the two global special effects as a user-selected global special effect, and the user-selected global special effect is displayed on an entire region of the target interface.

The release operation of the sliding gesture includes a finger lifting operation.

After a global special effect to be selected is determined from the two global special effects, the display region of the global special effect to be selected can get larger than the display region of the other global special effect through the sliding gesture, and then the sliding gesture may be released. In response to detecting the release operation of the sliding gesture, the global special effect having the larger display region in the two global special effects is determined as the user-selected global special effect by the terminal device, and the user-selected global special effect is displayed on an entire region of the target interface.

The method for switching global special effects is provided by the embodiments. In response to detecting a sliding gesture on a target interface, two global special effects to be switched are determined according to the sliding direction of the sliding gesture. During the sliding process of the sliding gesture, the two global special effects are displayed on two sides of the target interface, and the display regions of the two global special effects are changed according to the sliding displacement of the sliding gesture. In response to detecting a release operation of the sliding gesture, a global special effect having a larger display region from the two global special effects is determined as a user-selected global special effect and the user-selected global special effect is displayed on an entire region of the target interface. That is, the two global special effects are switched by the sliding gesture and the two global special effects are simultaneously displayed during the sliding process of the sliding gesture, therefore, it is convenient for the user to compare the two global special effects, and the switching efficiency and the user experience are improved.

In an embodiment, the sliding displacement includes a transversal displacement component.

The step of changing display regions of the two global special effects according to the sliding displacement of the sliding gesture includes a step described below:

Changing the display regions of the two global special effects on a left side and a right side of the target interface according to the transversal displacement component of the sliding gesture.

A display status of the target interface may be a vertical screen status or a horizontal screen status. In a case where the display status of the target interface is the vertical screen status, the display regions of the two global special effects displayed on the left side and the right side of the target interface are changed by the transversal displacement component of the sliding gesture, i.e., a displacement component parallel to a shorter side of the display screen. In a case where the display status of the target interface is the horizontal screen status, the display regions of the two global special effects displayed on the left side and the right side of the target interface are changed by the transversal displacement component of the sliding gesture, i.e., a displacement component parallel to a longer side of the display screen. Along with the increasing of the transversal displacement component of the sliding gesture, the display region of the first global special effect gets smaller, and the display region of the second global special effect gets larger. By displaying the two global special effects on the left side and the right side simultaneously, it is convenient for the user to compare the two global special effects, and the switching efficiency of the global special effects is further improved.

Embodiment Two

Figure 3:
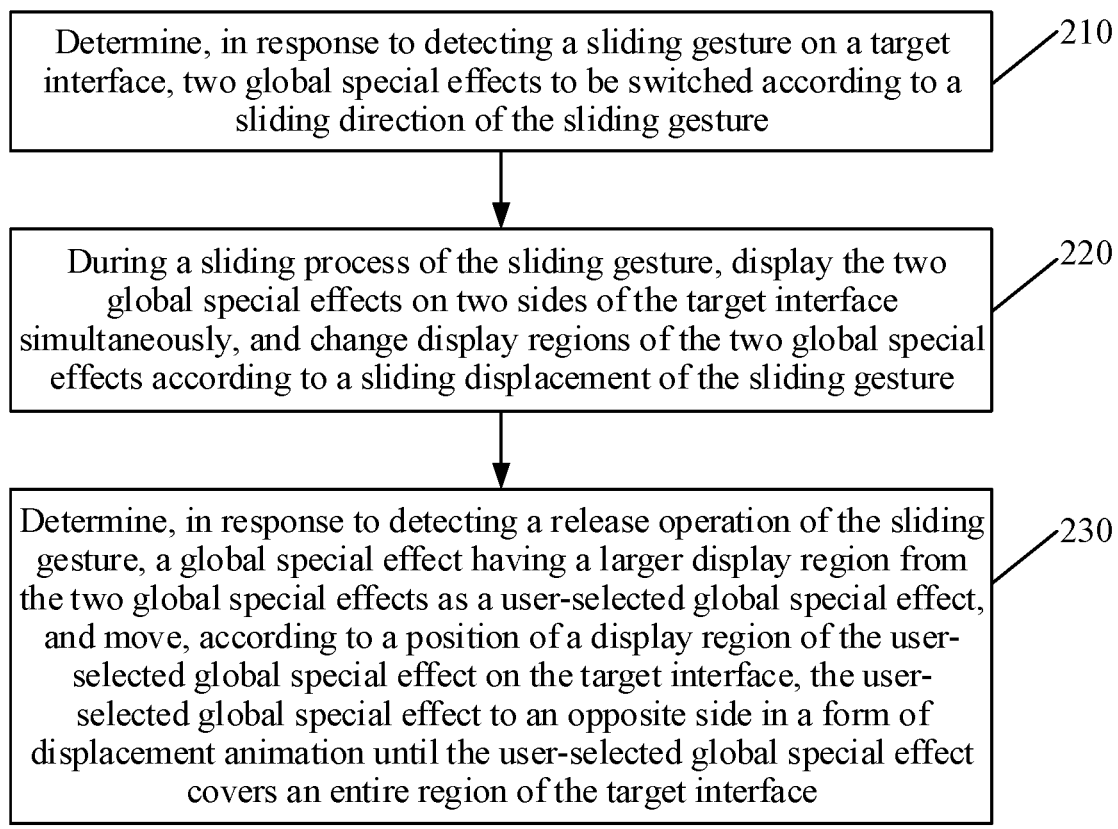
FIG. 3 is a flowchart of a method for switching global special effects according to embodiment two of the present disclosure.

FIG. 3 is a flowchart of a method for switching global special effects according to embodiment two of the present disclosure. Displaying the user-selected global special effect on the entire region of the target interface further includes a step described below. According to a position of the display region of the user-selected global special effect on the target interface, the user-selected global special effect is moved to an opposite side in a form of translate animation until the user-selected global special effect covers the entire region of the target interface. The method includes steps 210, 220 and 230.

In step 210, in response to detecting a sliding gesture on a target interface, two global special effects to be switched are determined according to a sliding direction of the sliding gesture.

In step 220, during a sliding process of the sliding gesture, the two global special effects are displayed on two sides of the target interface simultaneously, and display regions of the two global special effects are changed according to a sliding displacement of the sliding gesture.

In step 230, in response to detecting a release operation of the sliding gesture, a global special effect having a larger display region is determined, from the two global special effects, as a user-selected global special effect, and the user-selected global special effect is moved, according to the position of the display region of the user-selected global special effect on the target interface, to the opposite side in the form of translate animation until the user-selected global special effect covers the entire region of the target interface.

After the user-selected global special effect is determined, the user-selected global special effect is moved to the opposite side in the form of translate animation until the user-selected global special effect covers the entire region of the target interface. For example, when the two global special effects are displayed on the left side and the right side of the target interface simultaneously, a release operation of the sliding gesture is detected and a display region of the global special effect located on the left side of the target interface is relatively large, therefore, the global special effect on the left side is switched on, and the translate animation is moved from left to right during the switching process. That is, the global special effect on the left side and the global special effect on the right side are moved from left to right simultaneously until the global special effect on the left side covers the entire region of the target interface, and at the same time, the global special effect on the right side is moved out of the target interface. In a case where the release operation of the sliding gesture is detected and a display region of the global special effect located on the right side of the target interface is relatively large, the global special effect on the right side is switched on, and the translate animation is moved from right to left during the switching process. That is, the global special effect on the left side and the global special effect on the right side are moved from right to left simultaneously until the global special effect on the right side covers the entire region of the target interface, and at the same time, the global special effect on the left side is moved out of the target interface.

In the method for switching global special effects provided by the embodiment, after the user-selected global special effect is determined, the user-selected global special effect is moved to the opposite side in the form of translate animation until the user-selected global special effect covers the entire region of the target interface according to the position of the user-selected global special effect on the target interface, thus enriching the interface effect and further improving the user experience.

Embodiment Three

Figure 4:
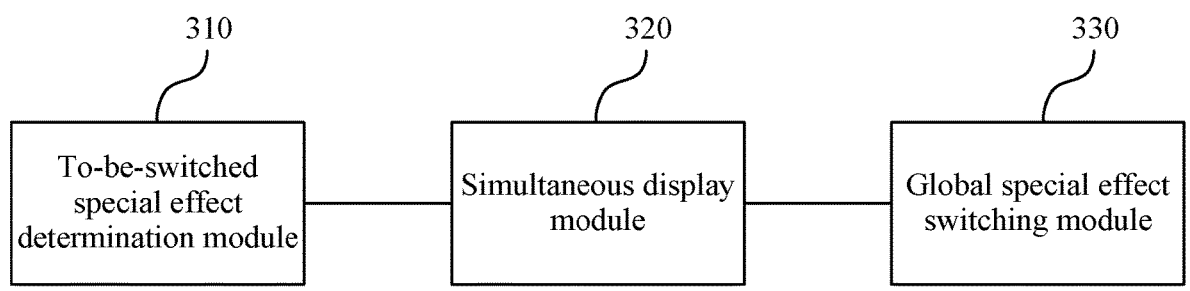
FIG. 4 is a structural diagram of an apparatus for switching global special effects according to embodiment three of the present disclosure.

FIG. 4 is a structural diagram of an apparatus for switching global special effects according to embodiment three of the present disclosure. The present embodiment may be applicable to a case of switching the global special effects of a video or a photo. A method for switching global special effects may be performed by the apparatus. The apparatus may be implemented by at least one of software or hardware and may be generally integrated into a terminal device such as a mobile phone or a tablet computer. As shown in FIG. 4, the apparatus for switching global special effects of the present embodiment includes a to-be-switched special effect determination module 310, a simultaneous display module 320 and a global special effect switching module 330.

The to-be-switched special effect determination module 310 is configured to determine, in response to detecting a sliding gesture on a target interface, two global special effects to be switched according to a sliding direction of the sliding gesture.

The simultaneous display module 320 is configured to display, during a sliding process of the sliding gesture, the two global special effects on two sides of the target interface simultaneously, and change display regions of the two global special effects according to a sliding displacement of the sliding gesture.

The global special effect switching module 330 is configured to determine, in response to detecting a release operation of the sliding gesture, a global special effect having a larger display region from the two global special effects as a user-selected global special effect, and display the user-selected global special effect on an entire region of the target interface.

In an embodiment, the sliding displacement includes a transversal displacement component, and the simultaneous display module includes a display region change unit. The display region change unit is configured to change display regions of the two global effects on a left side and a right side of the target interface according to the transversal displacement component of the sliding gesture.

In an embodiment, the global special effect switching module includes a translate animation switching unit. The translate animation switching unit is configured to move, according to a position of the display region of the user-selected global special effect on the target interface, the user-selected global special effect to an opposite side in a form of translate animation until the user-selected global special effect covers the entire region of the target interface.

In an embodiment, the target interface includes a video capture interface, a video editing interface, a photo capture interface or a photo editing interface.

In an embodiment, the global special effect includes at least one of a filter or transparency.

The above-mentioned apparatus for switching global special effects may perform the method for switching global special effects according to any embodiment of the present disclosure, and has functional modules and beneficial advantages corresponding to the method performed. The technical details not described in detail in the embodiment may refer to the method for switching global special effects according to any embodiment of the present disclosure.

Embodiment Four

Figure 5:
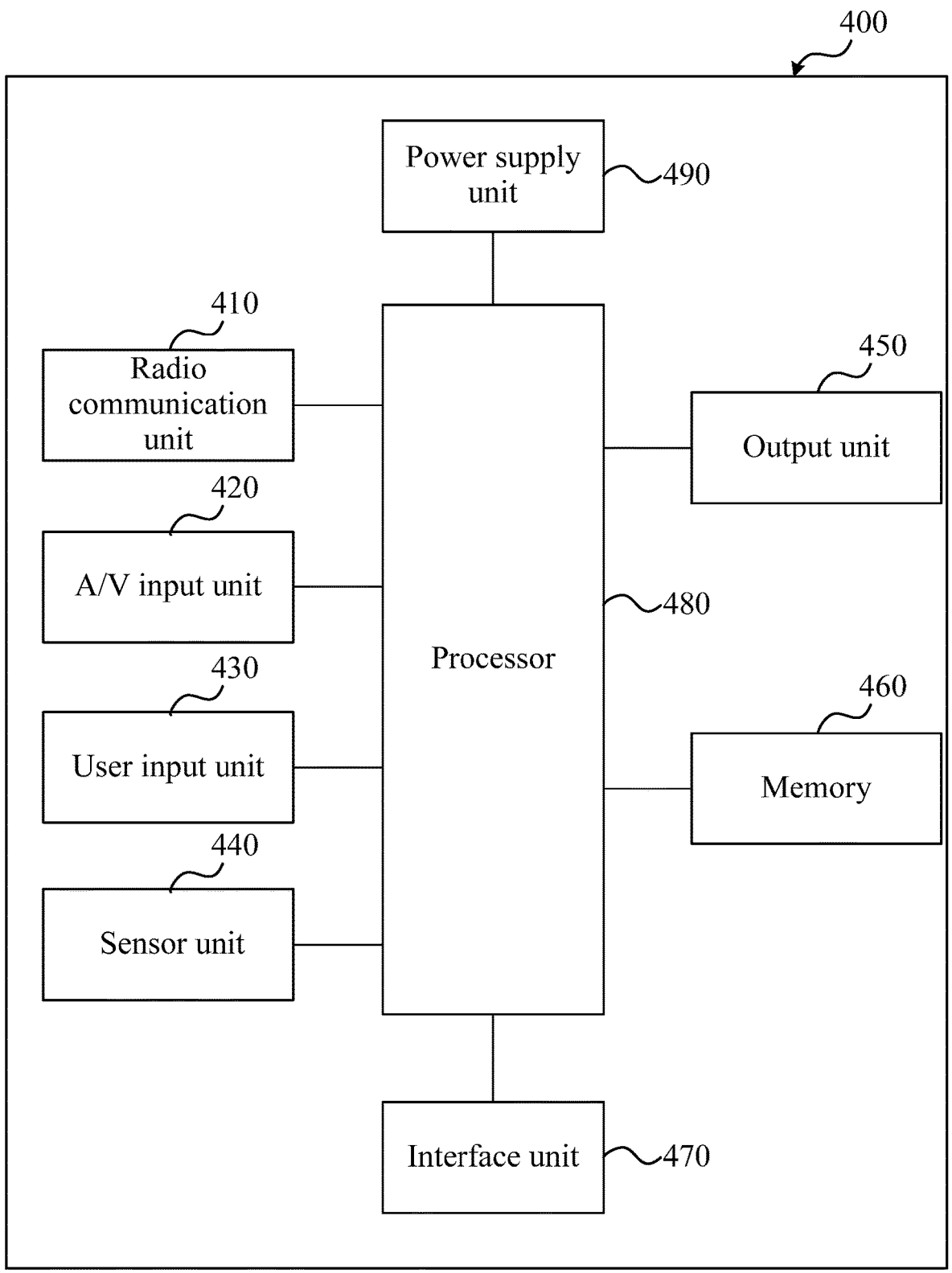
FIG. 5 is a structural diagram of hardware of a terminal device according to embodiment four of the present disclosure.

FIG. 5 is a structural hardware diagram of a terminal device according to embodiment four of the present disclosure. A terminal device may be implemented in various forms. The terminal device in the present disclosure may include, but is not limited to, a mobile terminal device such as a mobile phone, a smart phone, a laptop, a digital broadcast receiver, a personal digital assistant (PDA), a portable Android device (PAD), a portable media player (PMP), a navigation apparatus, an in-vehicle terminal device, an in-vehicle display terminal and an in-vehicle electronic rearview mirror, and a stationary terminal device such as a digital television (TV) and a desktop computer.

As shown in FIG. 5, the terminal device 400 may include a radio communication unit 410, an audio/video (A/V) input unit 420, a user input unit 430, a sensor unit 440, an output unit 450, a memory 460, an interface unit 470, a processor 480, a power supply unit 490, and the like. Although FIG. 5 shows the terminal device having various elements, it is to be understood that it is not required to implement all the shown elements, and more or fewer elements may be implemented instead.

The radio communication unit 410 allows the terminal device 400 to perform radio communication with a radio communication system or network. The A/V input unit 420 is configured to receive an audio signal or a video signal. The user input unit 430 may generate key input data to control various operations of the terminal device according to a command input by the user. The sensor unit 440 detects a current state of the terminal device 400, a position of the terminal device 400, a presence or absence of touch input by the user for the terminal device 400, an orientation of the terminal device 400, acceleration or deceleration movement and direction of the terminal device 400, and the like, and generate commands or signals for controlling operations of the terminal device 400. The interface unit 470 serves as an interface through which at least one external apparatus can communicate with the terminal device 400. The output unit 450 is configured to provide an output signal in at least one of a visual manner, an audio manner, or a tactile manner. The memory 460 may store software programs or the like for processing and control operations performed by the processor 480, or may temporarily store data that has been output or will be output. The memory 460 may include at least one type of storage media. The terminal device 400 may cooperate with a network storage apparatus that performs a storage function of the memory 460 through a network connection. The processor 480 usually controls an overall operation of the terminal device. In addition, the processor 480 may include a multimedia module for reproducing or playing back multimedia data. The processor 480 may perform a pattern recognition processing to recognize hand input or picture drawing input performed on a touch panel as characters or images. The power supply unit 490 controlled by the processor 480 receives external power or internal power and provides appropriate power required to operate the plurality of elements and components.

The processor 480 may perform various functional applications and data processing of the terminal device 400 by running programs stored in the memory 460, for example, perform the method for switching global special effects provided by the embodiment of the disclosure. The method includes steps described below: in response to detecting a sliding gesture on a target interface, two global special effects to be switched are determined according to a sliding direction of the sliding gesture; during a sliding process of the sliding gesture, the two global special effects are displayed on two sides of the target interface, and display regions of the two global special effects are changed according to a sliding displacement of the sliding gesture; in response to detecting a release operation of the sliding gesture, a global special effect having a larger display region is determined from the two global special effects as a user-selected global special effect and the user-selected global special effect is displayed on an entire region of the target interface.

Embodiment Five

The embodiment five of the present disclosure further provides a storage medium storing computer-executable instructions. When executed by a computer processor, the computer-executable instructions perform the method for switching global special effects. The method includes steps described below: in response to detecting a sliding gesture on a target interface, two global special effects to be switched are determined according to a sliding direction of the sliding gesture; during a sliding process of the sliding gesture, the two global special effects are displayed on two sides of the target interface, and display regions of the two global special effects are changed according to a sliding displacement of the sliding gesture; in response to detecting a release operation of the sliding gesture, a global special effect having a larger display region is determined form the two global special effects as a user-selected global special effect and the user-selected global special effect is displayed on an entire region of the target interface.

In the storage medium storing computer-executable instructions provided in the embodiment of the present disclosure, the computer-executable instructions implement not only the above-mentioned method operations but also related operations in the method for switching global special effects provided in any embodiment of the present disclosure.

From the above description of embodiments, it is apparent to those skilled in the art that the present disclosure may be implemented by means of software and necessary general-purpose hardware, or may of course be implemented by hardware, but in many cases the former is a preferred embodiment. Based on this understanding, the solutions provided by the present disclosure substantially, or the part contributing to the related art, may be embodied in a form of a software product. The software product is stored in a computer readable storage medium, such as a computer floppy disk, a read-only memory (ROM), a random access memory (RAM), a flash, a hard disk or an optical disk, and includes several instructions for enabling a computer device (which may be a personal computer, a server or a network device) to execute the method according to each embodiment of the present disclosure.

It is to be noted that units and modules included in the embodiment of the above-mentioned apparatus for switching global special effects are just divided according to functional logic, and the division is not limited to this, as long as the corresponding functions can be achieved. In addition, the specific names of the functional units are just intended for distinguishing, and are not to limit the scope of the present disclosure.

What is claimed is:

1. A method for switching global special effects, comprising:
    determining, in response to detecting a sliding gesture on a target interface, two global special effects to be switched for a same photo or a same video according to a sliding direction of the sliding gesture;
    displaying, during a sliding process of the sliding gesture, the two global special effects on two sides of the target interface simultaneously, and changing display regions of the two global special effects according to a sliding displacement of the sliding gesture; and
    determining, in response to detecting a release operation of the sliding gesture, a global special effect having a larger display region from the two global special effects as a user-selected global special effect, and displaying the user-selected global special effect on an entire region of the target interface;
    wherein the method further comprises: in a case where a global special effect is used on the target interface, switching two adjacent global special effects according to a sliding gesture in a same direction or in an opposite direction to a preset sliding gesture; wherein the two adjacent global special effects comprises the global special effect used on the target interface, and a global special effect which is stored adjacent to the global special effect used on the target interface and determined according to the sliding gesture in the same direction or in the opposite direction to the preset sliding gesture.

2. The method of claim 1, wherein the sliding displacement comprises a transversal displacement component; and
    wherein changing display regions of the two global special effects according to the sliding displacement of the sliding gesture comprises:
    changing display regions of the two global special effects on a left side and a right side of the target interface according to the transversal displacement component of the sliding gesture.

3. The method of claim 1, wherein displaying the use-selected global special effect on the entire region of the target interface comprises:
    moving, according to a position of the display region of the use-selected global special effect on the target interface, the use-selected global special effect to an opposite side in a form of translate animation until the use-selected global special effect covers the entire region of the target interface.

4. The method of claim 1, wherein the target interface comprises a video capture interface, a video editing interface, a photo capture interface or a photo editing interface.

5. The method of claim 1, wherein the global special effect comprises at least one of a filter or transparency.

6. A terminal device, comprising:
    a memory configured to store instructions; and
    one or more processors coupled to the memory, the one or more processors configured, in conjunction with execution of the instructions stored in the memory, to:
    determine, in response to detecting a sliding gesture on a target interface, two global special effects to be switched for a same photo or a same video according to a sliding direction of the sliding gesture;
    display, during a sliding process of the sliding gesture, the two global special effects on two sides of the target interface simultaneously, and change display regions of the two global special effects according to a sliding displacement of the sliding gesture; and determine, in response to detecting a release operation of the sliding gesture, a global special effect having a larger display region from the two global special effects as a user-selected global special effect, and display the user-selected global special effect on an entire region of the target interface;

wherein the to-be-switched special effect determination module is further configured to: in a case where a global special effect is used on the target interface, switch two adjacent global special effects according to a sliding gesture in a same direction or in an opposite direction to a preset sliding gesture; wherein the two adjacent global special effects comprises the global special effect used on the target interface, and a global special effect which is stored adjacent to the global special effect used on the target interface and determined according to the sliding gesture in the same direction or in the opposite direction to the preset sliding gesture.

7. The terminal device of claim 6, wherein the sliding displacement comprises a transversal displacement component;

changing display regions of the two global special effects according to the sliding displacement of the sliding gesture comprises:

changing display regions of the two global special effects on a left side and a right side of the target interface according to the transversal displacement component of the sliding gesture.

8. The terminal device of claim 6, wherein displaying the use-selected global special effect on the entire region of the target interface comprises:

moving, according to a position of the display region of the use-selected global special effect on the target interface, the use-selected global special effect to an opposite side in a form of translate animation until the use-selected global special effect covers the entire region of the target interface.

9. The terminal device of claim 6, wherein the target interface comprises a video capture interface, a video editing interface, a photo capture interface or a photo editing interface.

10. The terminal device of claim 6, wherein the global special effect comprises at least one of a filter or transparency.

11. A non-transitory computer-readable storage medium, which is configured to store a computer program, wherein the computer program, when executed by a processor, performs steps of:

determining, in response to detecting a sliding gesture on a target interface, two global special effects to be switched for a same photo or a same video according to a sliding direction of the sliding gesture;

displaying, during a sliding process of the sliding gesture, the two global special effects on two sides of the target interface simultaneously, and changing display regions of the two global special effects according to a sliding displacement of the sliding gesture; and determining, in response to detecting a release operation of the sliding gesture, a global special effect having a larger display region from the two global special effects as a user-selected global special effect, and displaying the user-selected global special effect on an entire region of the target interface;

wherein the computer program further performs step of: in a case where a global special effect is used on the target interface, switching two adjacent global special effects according to a sliding gesture in a same direction or in an opposite direction to a preset sliding gesture; wherein the two adjacent global special effects comprises the global special effect used on the target interface, and a global special effect which is stored adjacent to the global special effect used on the target interface and determined according to the sliding gesture in the same direction or in the opposite direction to the preset sliding gesture.

12. The non-transitory computer-readable storage medium of claim 11, wherein the sliding displacement comprises a transversal displacement component;

wherein changing display regions of the two global special effects according to the sliding displacement of the sliding gesture comprises:

changing display regions of the two global special effects on a left side and a right side of the target interface according to the transversal displacement component of the sliding gesture.

13. The non-transitory computer-readable storage medium of claim 11, wherein displaying the use-selected global special effect on the entire region of the target interface comprises:

moving, according to a position of the display region of the use-selected global special effect on the target interface, the use-selected global special effect to an opposite side in a form of translate animation until the use-selected global special effect covers the entire region of the target interface.

14. The non-transitory computer-readable storage medium of claim 11, wherein the target interface comprises a video capture interface, a video editing interface, a photo capture interface or a photo editing interface.

15. The non-transitory computer-readable storage medium of claim 11, wherein the global special effect comprises at least one of a filter or transparency.

* * * * *